(12) United States Patent
Iwasawa et al.

(10) Patent No.: US 8,246,776 B2
(45) Date of Patent: Aug. 21, 2012

(54) CRANK FOR BICYCLE AND METHOD FOR MANUFACTURING THE SAME

(75) Inventors: Shigeo Iwasawa, Ehime (JP); Yukitane Kimoto, Ehime (JP); Shin Tanabe, Sakai (JP)

(73) Assignees: Toray Industries, Inc., Tokyo (JP); Shimano, Inc., Osaka (JP)

( * ) Notice: Subject to any disclaimer, the term of this patent is extended or adjusted under 35 U.S.C. 154(b) by 649 days.

(21) Appl. No.: 12/314,851

(22) Filed: Dec. 17, 2008

(65) Prior Publication Data
US 2009/0165947 A1 Jul. 2, 2009

(30) Foreign Application Priority Data
Dec. 28, 2007 (JP) .................................. 2007-339430

(51) Int. Cl.
*B29C 65/00* (2006.01)
*B29C 65/48* (2006.01)
*B32B 37/00* (2006.01)
*F02F 1/06* (2006.01)
*C09J 5/10* (2006.01)
*C09J 7/00* (2006.01)
*B62M 3/00* (2006.01)

(52) U.S. Cl. .................. 156/306.9; 156/295; 156/303.1; 156/313; 74/594.1

(58) Field of Classification Search .................... 156/60, 156/196, 212, 213, 216, 242, 244.11, 244.13, 156/244.22, 244.23, 244.24, 245, 285, 292, 156/293, 294, 295, 296, 303.1, 306.6, 307.1, 156/307.3, 310, 313, 306.9; 74/594.1, 594.2, 74/594.3, 594.4, 595, 600, 601, 602; 280/288.4, 280/293, 294, 256, 259, 260, 261
See application file for complete search history.

(56) References Cited

U.S. PATENT DOCUMENTS
2003/0019324 A1* 1/2003 Valle ............................ 74/594.1
2007/0034043 A1* 2/2007 Feltrin ......................... 74/594.1
* cited by examiner

*Primary Examiner* — Philip Tucker
*Assistant Examiner* — Brian R Slawski
(74) *Attorney, Agent, or Firm* — Kubovcik & Kubovcik

(57) ABSTRACT

Disclosed are a method for manufacturing a crank for a bicycle by bonding structural members to each other with an adhesive comprising; a step for applying the adhesive in a line-like or dot-like form in correspondence with an intervention region of the adhesive; a step for disposing a fabric in correspondence with the intervention region of the adhesive; a step for expanding the adhesive applied in a line-like or dot-like form in the fabric; and a step for bonding the structural members to each other with the adhesive expanded in the fabric, and a crank for a bicycle manufactured by the method. When the crank for a bicycle is manufactured by bonding the structural members to each other with the adhesive, the adhesive can be applied easily at a high accuracy and a good repeatability, variations of application condition and amount of used adhesive can be suppressed, and variation in quality can be suppressed.

17 Claims, 7 Drawing Sheets

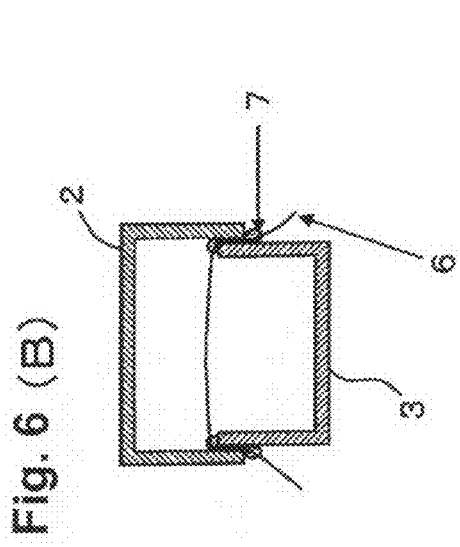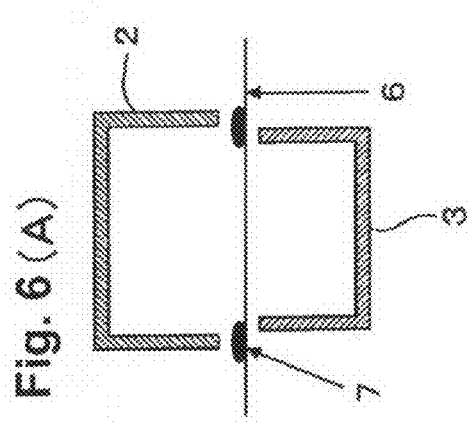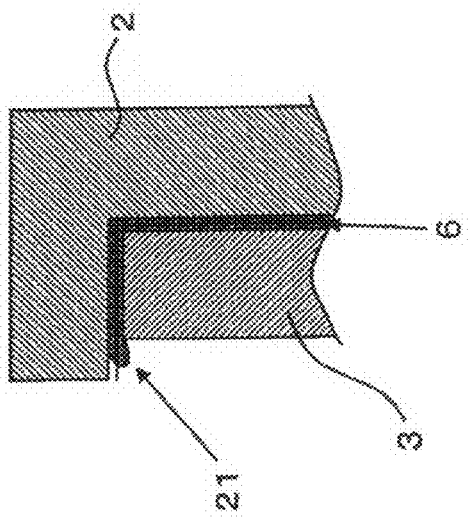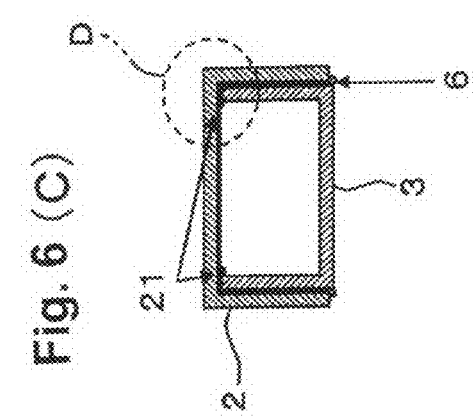

CRANK FOR BICYCLE AND METHOD FOR MANUFACTURING THE SAME

BACKGROUND OF THE INVENTION

1. Field of the Invention

The present invention relates to a crank for a bicycle and a method for manufacturing the same, and specifically, to a crank for a bicycle formed by bonding structural members to each other with an adhesive intervening therebetween and a method for manufacturing the same.

2. Description of Related Art

A crank for a bicycle is frequently formed from members each having a relatively complicated three-dimensional shape which has a curved-surface portion or a rising-wall portion, and when a fiber reinforced plastic (hereinafter, abbreviated as "FRP") is used as a material for weight-saving and the like, structural members of FRP members or an FRP member and another material member are frequently bonded to each other by using an adhesive. In a conventional technology, when the structural members are bonded to each other with an adhesive, for example, the adhesive is applied to a bonding portion of one of the members, the other member is assembled with the member applied with the adhesive, and the structural members are bonded to each other with the adhesive intervening therebetween.

Because the structural member to be applied with an adhesive has a relatively complicated three-dimensional shape which has a curved-surface portion or a rising-wall portion, as described above, application of such adhesive is usually carried out by manual operation. Because adhesive is applied by manual operation, more or less a variation of application condition or a variation of amount of used adhesive (application amount) occurs, and ascribed thereto, a variation in quality such as bonding strength or a variation in product weight may occur. Although it is considered to use a robot for application of adhesive, in practice, there are many cases where desired application of adhesive to a complicated curved-surface portion, an undercut portion, etc. is difficult, and even if such application of adhesive is possible, introducing such a robot for a bonding process results in very expensive equipment cost.

SUMMARY OF THE INVENTION

Accordingly, it is an object of the present invention to provide a method for manufacturing a crank for a bicycle by bonding structural members to each other with an adhesive, in which the adhesive can be applied to a predetermined place at a desirable condition easily at a high accuracy and a good repeatability, occurrence of variation in application condition and amount of used adhesive can be suppressed, and occurrence of variation in quality such as bonding strength can be suppressed, and a crank for a bicycle manufactured by the method.

To achieve the foregoing and other objects, a method for manufacturing a crank for a bicycle according to the present invention by bonding structural members of the crank to each other with an adhesive intervening between the structural members, comprises a step for applying the adhesive in a line-like or dot-like form in correspondence with an intervention region of the adhesive; a step for disposing a fabric in correspondence with the intervention region of the adhesive; a step for expanding the adhesive applied in a line-like or dot-like form in the fabric; and a step for bonding the structural members to each other with the adhesive expanded in the fabric.

Namely, in the method for manufacturing a crank for a bicycle according to the present invention, a fabric is disposed in the bonding region of the structural members (that is, the intervention region of the adhesive), the adhesive is not applied to the entire intervention region, first, the adhesive applied in correspondence with the intervention region in a line-like or dot-like form, the adhesive applied in a line-like or dot-like form is expanded in the fabric, the adhesive is expanded substantially over the entire region of a necessary predetermined bonding region, and the structural members are bonded to each other with the adhesive expanded in the fabric. Because the initial application of the adhesive may be an application in a line-like or dot-like form, even if the structural member to be bonded has a relatively complicated three-dimensional shape which has a curved-surface portion or a rising-wall portion, a desirable application can be easily carried out. By expanding this adhesive applied in a line-like or dot-like form in the fabric, an adhesive layer required for bonding of the structural members to each other can be efficiently formed. Where, the "expanding the adhesive in the fabric" means a concept including impregnation into the fabric, and a concept including not only expansion of the line-like or dot-like applied adhesive in a direction along the plane of the fabric but also impregnation in the thickness direction of the fabric, for example, up to a surface opposite to the adhesive applied surface. Therefore, even in a case where the adhesive is applied only on one surface of the fabric in a line-like or dot-like form, by expanding the adhesive in the fabric, the adhesive can exist in the fabric and over both surfaces of the fabric substantially over the entire range of the predetermined region to be present with the adhesive, without making a distinction between the application surface side and the non-application surface side, and therefore, by the adhesive expanded in the fabric at such a condition, the structural members are bonded to each other surely and at a very good condition. Namely, the adhesive is expanded via the fabric in the predetermined region to be interposed with the adhesive at a desirable condition easily at a high accuracy, and by employing an adequate kind of fabric as the interposed fabric, the adhesive is interposed at a desirable condition with a good repeatability, and the structural members are bonded to each other at a good condition via the adhesive layer. Further, the region, in which the adhesive is expanded via the fabric, is limited to a predetermined bonding region required, and the thickness of the adhesive layer is regulated at a condition suppressed with variation in thickness by the thickness of the fabric, and therefore, variation in amount of used adhesive can be suppressed.

In such a method for manufacturing a crank for a bicycle according to the present invention, it is preferred that a nonwoven fabric is used as the above-described fabric. As to the kind, the thickness and the weight of the nonwoven fabric to be used, performances are preferably required such as easy expanding of the adhesive in the fabric, in particular, capability of easily and surely impregnating up to the non-application surface.

Further, the step for applying the adhesive in a line-like or dot-like form and the step for expanding the adhesive applied in a line-like or dot-like form in the fabric can be carried out, for example, as follows. Namely, after the adhesive is applied to the fabric in a line-like or dot-like form, the fabric applied with the adhesive is disposed in correspondence with the intervention region of the adhesive, and the adhesive can be expanded in the disposed fabric. Alternatively, after the adhesive is applied to at least one of the structural members in a line-like or dot-like form, the fabric is disposed in correspondence with the intervention region of the adhesive of the structural member applied with the adhesive, and the adhesive can be expanded in the disposed fabric. Namely, the application of the adhesive in a line-like or dot-like form may be carried out to the fabric, and may be carried out to the structural member.

The step for expanding the adhesive applied in a line-like or dot-like form in the fabric can be carried out, utilizing an operation for assembling the structural members at a predetermined positional relationship, and it is possible to expand the adhesive, having been applied in a line-like or dot-like form, in the fabric, utilizing a nipping force at the time of assembly which is applied in a gap formed between the structural members. Because the operation for the assembly and the operation for expansion of the adhesive are carried out simultaneously, the operation for the bonding can be simplified, and the time for the bonding can be shortened.

Such a method for manufacturing a crank for a bicycle according to the present invention is suitable for a case where at least one of the structural members is formed from a fiber reinforced plastic (FRP). Since generally a mechanical bonding means is not used for an FRP member so much, by interposing the above-described optimum adhesive layer, the structural members can be bonded to each other at a good condition and at a required quality satisfying a target bonding strength and the like.

The structure of the crank in the present invention is not particularly restricted as long as the crank is manufactured by bonding the structural members to each other via an adhesive. For example, the method for manufacturing a crank for a bicycle according to the present invention may include a step for bonding structural members, each having a C-shape cross section, to each other, or a step for bonding structural members, each forming a cross section with a hollow portion, to each other. In the latter case, it may be an embodiment wherein a structural member to be bonded by the adhesive expanded in the fabric comprises a block member disposed in the hollow portion. The block member may be an aluminum member. For example, an embodiment can be employed wherein FRP structural members each having a C-shape cross section are bonded to each other by the adhesive expanded in the fabric, a hollow portion is formed in the bonded both structural members, an aluminum block member is disposed in the hollow portion, the block member is bonded to one of the FRP structural members or both structural members by the adhesive expanded in the fabric. Further, in a case where an aluminum member is employed, by using the above-described fabric, it is possible to expect an advantage for preventing a galvanic corrosion for the aluminum surface covered with the fabric.

Further, in the method for manufacturing a crank for a bicycle according to the present invention, it is preferred that the fabric is disposed so as to extend over both sides of an edge of the intervention region of the adhesive. In such a disposition of the fabric, when the adhesive having been applied in a line-like or dot-like form is expanded in the fabric, it becomes possible to expand the adhesive up to a position which is stuck out of the bonding region (the bonding portion) of the structural members to each other, namely, up to a position which is slightly stuck out of the edge of the intervention region of the adhesive. In this stuck out position, the adhesive is released in the thickness direction of the fabric without being restricted by the gap between the structural members, and at that condition, the adhesive is held by the fabric (for example, nonwoven fabric) present there even if the adhesive is heated for curing and the viscosity of the adhesive is decreased, and therefore, the adhesive present there is formed in a form extending like a bead along the edge of the intervention region of the adhesive, and at such a condition the adhesive is cured. Such an adhesive portion (adhesive bead) adjacent to the bonding portion of the structural members and cured in a bead-like form along the edge of the bonding portion of the structural members, functions so as to relax a shear stress (shear lag effect) particularly when a tensile shear force is operated in a direction along the bonding surface in the bonding region of the structural members, and therefore, the bonding strength between the structural members, in particular, the resistance against tensile shear, can be increased.

A crank for a bicycle according to the present invention formed by structural members bonded to each other with an adhesive intervening at a bonding portion between the structural members, is characterized in that a fabric is interposed at the bonding portion together with the adhesive, and the adhesive is cured at a condition being expanded in the fabric.

In this crank for a bicycle according to the present invention, for example, the fabric is a nonwoven fabric, and at least one of the structural members is formed from a fiber reinforced plastic (FRP).

Further, the crank for a bicycle according to the present invention is formed, for example, as a crank in which structural members, each having a C-shape cross section, are bonded to each other, or a crank in which structural members, each forming a cross section with a hollow portion, are bonded to each other. In a case where the hollow portion is formed, a structural member bonded by the adhesive cured at a condition being expanded in the fabric may comprise a block member disposed in the hollow portion. As the block member, for example, an aluminum member can be used.

Further, in the crank for a bicycle according to the present invention, a structure may be employed wherein the fabric is disposed so as to extend over both sides of an edge of an intervention region of the adhesive, and in a fabric extending region at a non-bonding portion side adjacent to the edge, an adhesive stuck out of the bonding portion is cured in a bead-like form. The adhesive portion (adhesive bead) cured in a bead-like form can exhibit the aforementioned shear lag effect, and the bonding strength between the structural members, in particular, the resistance against tensile shear, can be increased.

Thus, in the crank for a bicycle and the method for manufacturing the same according to the present invention, since the fabric is interposed at the bonding portion of the structural members, the adhesive is expanded from a line-like or dot-like simplified application condition to a desirable application region for the bonding and the structural members are bonded to each other by the expanded adhesive, the adhesive can be applied to a predetermined target place at a desirable condition easily at a high accuracy and a good repeatability, occurrence of variation in application condition and amount of used adhesive can be suppressed, and occurrence of variation in quality such as bonding strength or product weight can be suppressed, thereby providing a crank for a bicycle excellent in quality.

Further objects, features, and advantages of the present invention will be understood from the following detailed description of preferred embodiments of the present invention with reference to the accompanying figures.

BRIEF DESCRIPTION OF THE DRAWINGS

Embodiments of the invention now are described with reference to the accompanying figures, which are given by way of example only, and are not intended to limit the present invention.

FIG. 6(A) to FIG. 6(C) are schematic sectional views showing a process for bonding of outer shell members in a case where there are stuck out portions of adhesive into a fabric, and FIG. 6(D) is an enlarged partial sectional view of portion D in FIG. 6(C).

EXPLANATION OF SYMBOLS

Figure 1:
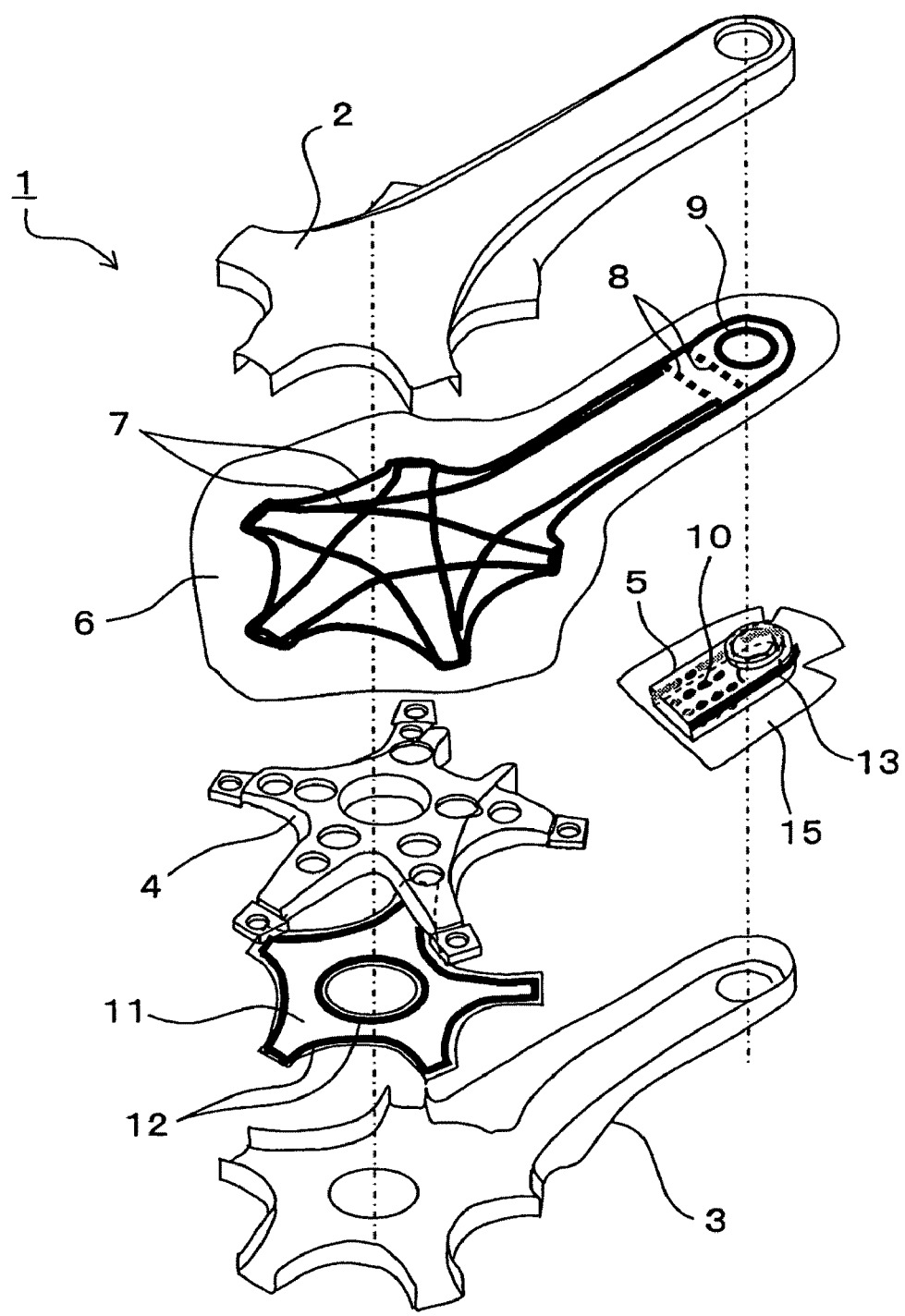
FIG. 1 is an exploded perspective view showing a method for manufacturing a crank for a bicycle according to an embodiment of the present invention.

1: crank for bicycle
2: first outer shell member
3: second outer shell member
4: core member
5: end core member
6, 11, 15: fabric
7, 8, 9, 10, 12, 13, 14: adhesive
21: adhesive stuck-out portion
31, 32: member to be bonded
33: adhesive layer
34: adhesive bead (stuck out portion of adhesive)

DETAILED DESCRIPTION OF PREFERRED EMBODIMENTS

Hereinafter, desirable embodiments of the present invention will be explained referring to the drawings.

FIGS. 1 to 5 depict a structure of a crank for a bicycle according to an embodiment of the present invention and a method for manufacturing the same. Where, FIGS. 1 to 5 show an example of the present invention, and especially, as to the shapes and the materials of the structural members, they are not limited to those shown in this embodiment. In FIG. 1, a crank for a bicycle 1 according to this embodiment comprises structural members of a first outer shell member 2 and a second outer shell member 3 fitted and bonded to each other and each having a C-shape cross section capable of forming a cross section with a hollow portion, a core member 4 formed as an aluminum block member having a relatively complicated three-dimensional star-like shape with radially extending portions which is disposed at a position of one end side in the hollow portion formed by fitting and bonding of the first outer shell member 2 and the second outer shell member 3, and an end core member 5 formed as an aluminum block member having a relatively simple thick plate-like shape which is disposed at a position of the other end side in the hollow portion formed by fitting and bonding of the first outer shell member 2 and the second outer shell member 3. In this embodiment, the first outer shell member 2 and the second outer shell member 3 are formed as FRP structural members, for example, carbon fiber reinforced plastic structural members. The crank for a bicycle 1 is manufactured by bonding these structural members 2-5 with an adhesive intervening between structural members.

Figure 2:
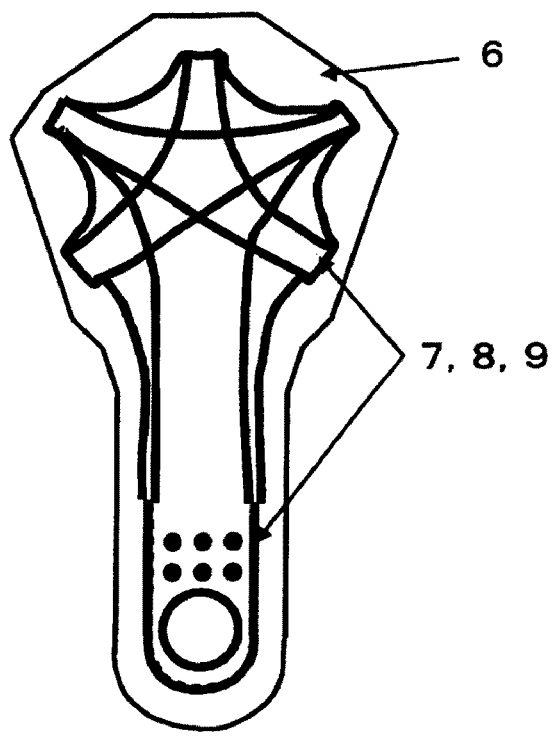
FIG. 2 is a plan view of a fabric applied with an adhesive for use in the method shown in FIG. 1.

In this bonding using the adhesive, in this embodiment, for the bonding of first outer shell member 2 and second outer shell member 3 and the bonding of first outer shell member 2 and core member 4, adhesive 7 is applied to a fabric 6 (for example, a nonwoven fabric) in a line-like form along the shapes of the first outer shell member 2 and the core member 4, and the applied adhesive 7 is expanded in the fabric 6 and used for the bonding as described later. Further, for the bonding of first outer shell member 2 and end core member 5, adhesive 8 applied to fabric 6 in a dot-like form and thereafter expanded in the fabric 6 as described later, adhesive 9 applied to fabric 6 in a line-like form and thereafter expanded in the fabric 6 as described later, and adhesive 10 applied to one surface of end core member 5 in a dot-like form and thereafter expanded in the fabric 6 as described later, are used. To fabric 6, adhesives 7, 8 and 9 are applied in a line-like or dot-like form, for example, in a formation as shown in FIG. 2, relative to a plane-like fabric 6 before the bonding of structural members to each other. For the bonding between core member 4 and second outer shell member 3, a fabric 11 having a shape along the shape of core member 4 is used, and adhesive 12, which is applied to this fabric 12 in a form along the form of core member 4 and expanded in the fabric 11 at the time of bonding, is used. For the bonding between end core member 5 and second outer shell member 3, adhesive 13 applied to the end core member 5 in a line-like form and adhesive 14 (FIG. 4(A)) applied to the back surface side of the end core member 5 in a dot-like form are used, and after adhesives 13 and 14 are expanded in fabric 15 interposed between both structural members 5 and 3, they are served to the bonding.

Figure 3:
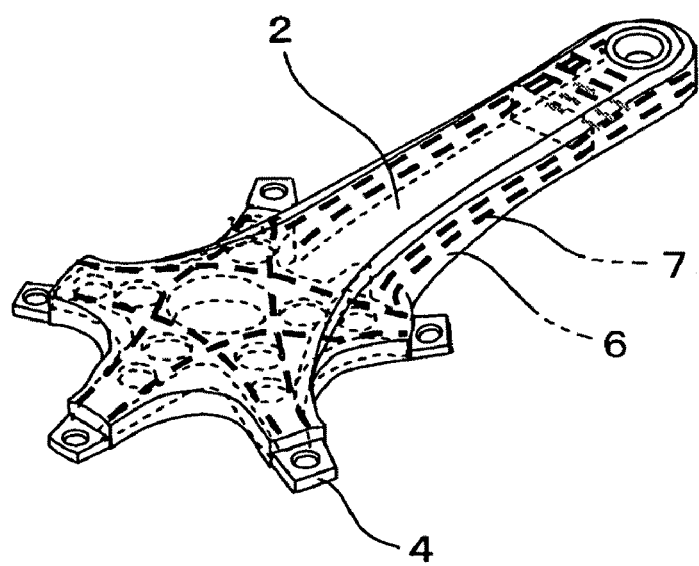
FIG. 3 is a perspective view showing a condition when structural members are bonded to each other using the fabric shown in FIG. 2.
Figure 4:
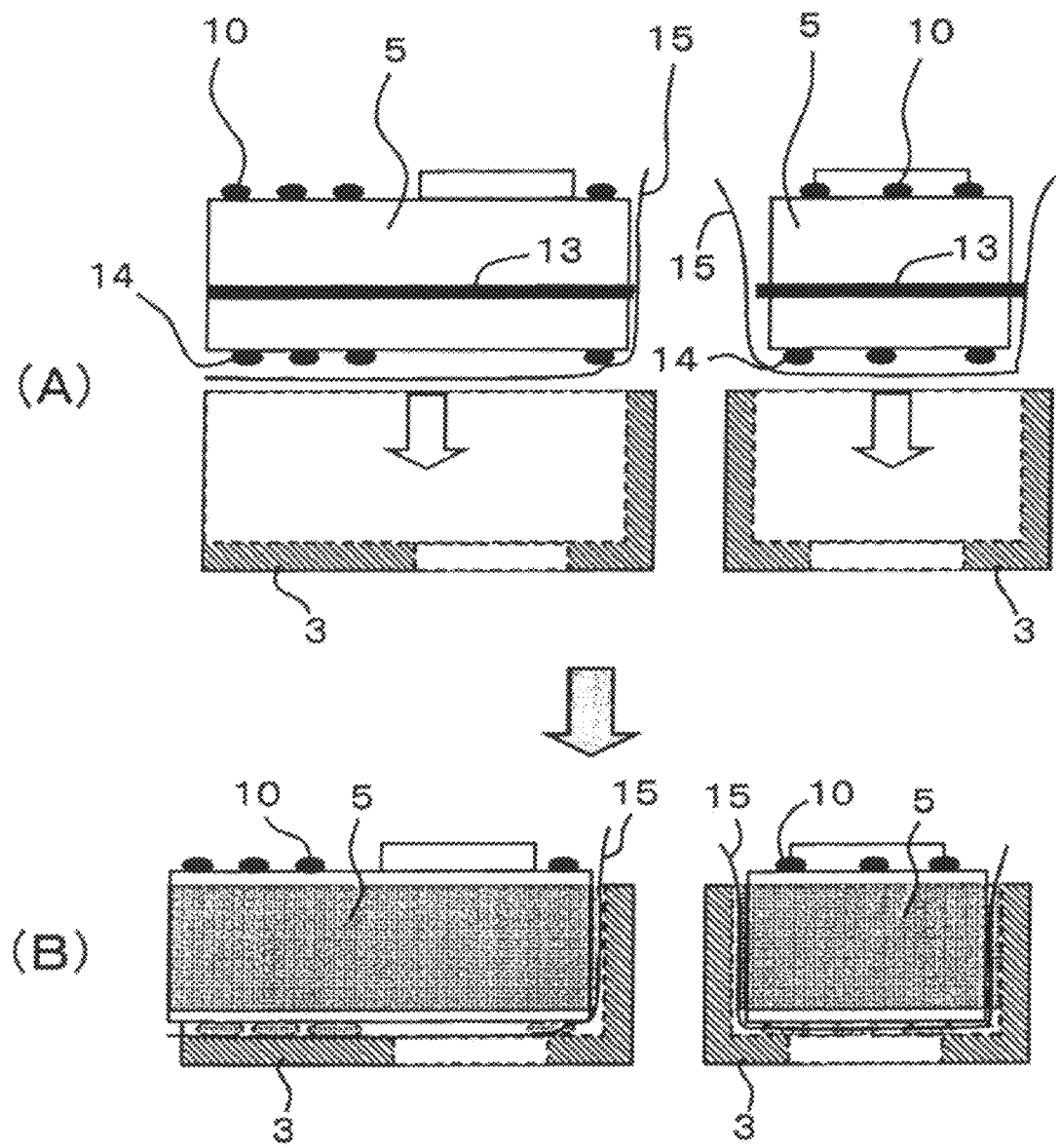
FIG. 4(A) and FIG. 4(B) are partial sectional views as viewed from different directions, showing a process for bonding of a portion of an end core member in the method shown in FIG. 1.
Figure 5:
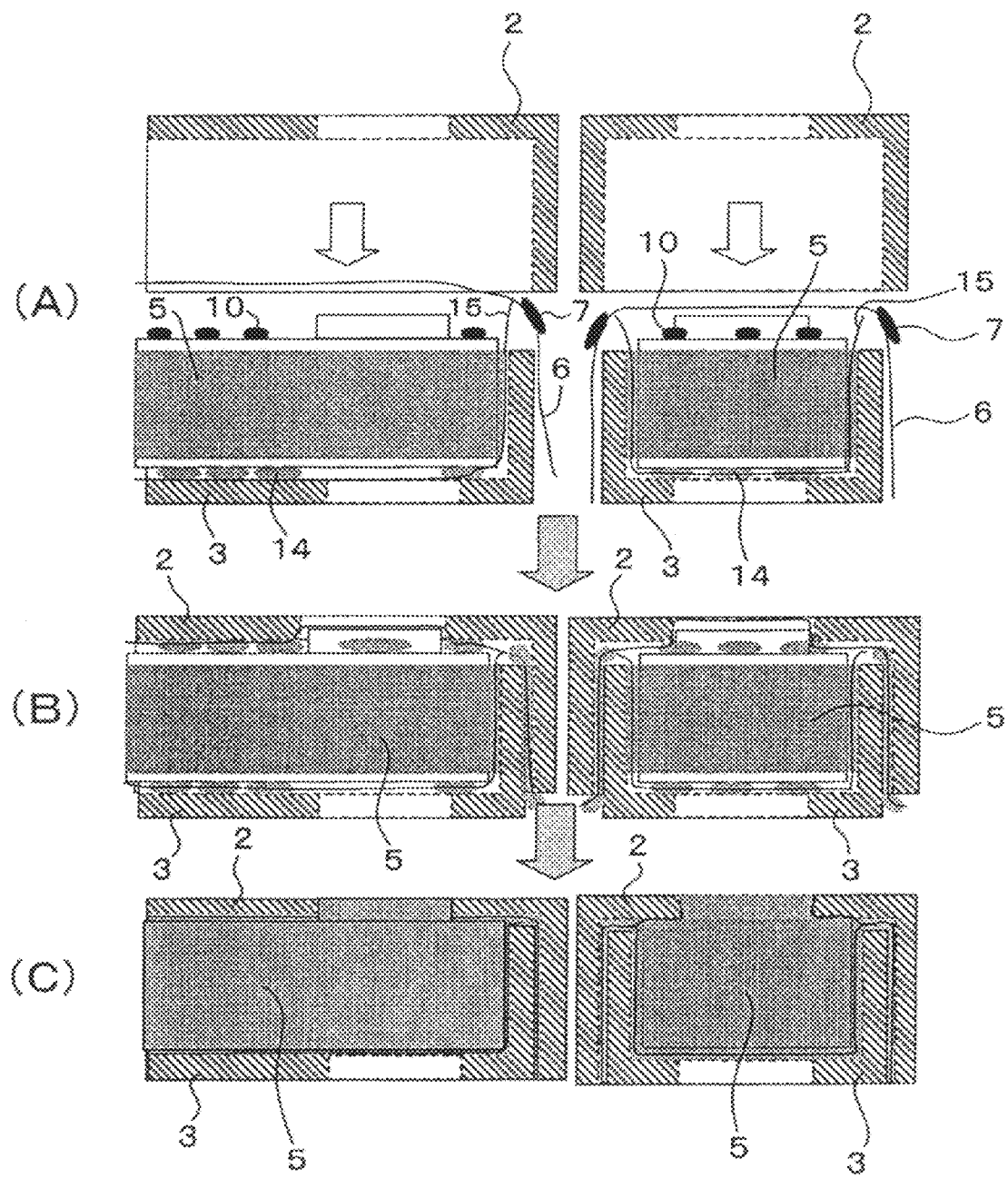
FIG. 5(A) to FIG. 5(C) are partial sectional views as viewed from different directions, showing a process for bonding of outer shell members in the method shown in FIG. 1 with respect to a portion of an end core member.

Using the above-described respective fabrics and respective structural members, the bonding of the structural members to each other is carried out, for example, as shown in FIGS. 3-5. FIG. 3 shows a state where fabric 6 applied with adhesive 7 is interposed between first outer shell member 2 having a C-shape cross section and core member 4. At this state, by pushing core member 4 relatively toward the inner surface side of first outer shell member 2 having a C-shape cross section, adhesive 7 having been applied to fabric 6 in a line-like form is expanded in the fabric 6, and expanded substantially uniformly between the outer surface of core member 4 and the inner surface of first outer shell member 2. At that time, because adhesive 7 having been applied in a line-like form is expanded in the plane direction of fabric 6 as well as up to the adhesive non-applied surface by being impregnated into the fabric 6, the adhesive 7 is expanded over substantially the entire region to be interposed with adhesive for the bonding of both members and over the part between both surfaces of fabric 6. Thus, first outer shell member 2 and core member 4 are bonded to each other via the adhesive expanded over substantially the entire region for the bonding, and therefore, both members are bonded in a good condition at a desirable target bonding strength.

Further, because this desirable expansion of the adhesive may be achieved merely by applying adhesive 7 to planar fabric 6 in a line-like form at the adhesive applying stage, the application can be carried out easily, a high accuracy is not required for the application itself, and a factor causing variation of the condition after application is very little.

Further, because fabric 6 applied with adhesive in a line-like or dot-like form can be disposed along the outer shape of the structural member even if core member 4 has a relatively complicated three-dimensional shape and at that state the adhesive having been applied in a line-like or dot-like form is expanded in fabric 6, the expansion of the adhesive 7 to a predetermined bonding region can be carried out very easily, for example, only by assembling first outer shell member 2 and core member 4 at a predetermined positional relationship.

Furthermore, since the adhesive expansion region is limited to the above-described region applied with the pushing force, in other words, limited to the bonding region in which the structural members are to be bonded to each other, and the thickness of the layer of the adhesive to be expanded can be regulated by the clearance between the structural members or the thickness of fabric 6, it is possible to suppress the amount of the adhesive to be used as little as possible, and it is also possible to suppress variation of the amount of the used adhesive extremely small.

FIG. 4 shows the state for the bonding of end core member 5 and second outer shell member 3. As shown in FIG. 4(A), end core member 5 is fitted into the C-shape cross section of second outer shell member 3 via an interposed fabric 15 at a state where adhesive 13 is applied in a line-like form and adhesives 10, 14 are applied in a dot-like form. By this fitting and assembly, as shown in FIG. 4(B), adhesive 13 having been applied in a line-like form and adhesives 14 having been applied in a dot-like form are pushed and expanded in fabric 15 substantially uniformly between the outer surface of end core member 5 and the inner surface of second outer shell member 3. At that time, similarly to the above-described state, because adhesives 13, 14 having been applied in line-like and dot-like forms are expanded in the plane direction of fabric 15 as well as expanded between both surfaces of the fabric 15 through being impregnated into the fabric 15, the adhesives are expanded at a good condition substantially over the entire region of the bonding region which is to be interposed with adhesive for the bonding of both members. Thus, because end core member 5 and second outer shell member 3 are bonded via the adhesive expanded over the entire bonding region, both members are bonded in a good condition at a desirable target bonding strength. Further, variation in bonding state and variation in amount of used adhesive can be suppressed.

FIG. 5 shows the state for the bonding of structural members of first outer shell member 2 and second outer shell member 3, in particular, with respect to the portion of end core member 5. As shown in FIG. 5(A), first outer shell member 2 is fitted into second outer shell member 3 inserted with end core member 5 as shown in FIG. 4, at a condition where fabric 6 applied with adhesive 7 in a line-like form is interposed (at a condition covered with the fabric 6). In this fitting step, first outer shell member 2 is gradually pushed down in the lower direction of the figure so as to achieve a predetermined positional relationship. At that time, as shown in FIGS. 5(B) and (C), adhesive 7 having been applied in a line-like form is expanded in the plane direction of fabric 6 in the clearance between the rising walls of first outer shell member 2 and second outer shell member 3 and at the same time, expanded between both surfaces of the fabric 6 through being impregnated into the fabric 6, and the adhesive is expanded at a good condition substantially over the entire region of the bonding region which is to be interposed with adhesive for the bonding of both members. Thus, because first outer shell member 2 and second outer shell member 3 are bonded via the adhesive expanded over the entire bonding region, both members are bonded in a good condition at a desirable target bonding strength. Further, variation in bonding state and variation in amount of used adhesive can be suppressed. At the same time, adhesive 10 having been applied to fabric 6 in a dot-like form is also expanded in the portion of fabric 6 present between end core member 5 and first outer shell member 2, and in a similar manner, the end core member 5 and the first outer shell member 2 are bonded to each other in a good condition. Where, in a case where the expansion of the adhesive for bonding between end core member 5 and second outer shell member 3 shown in FIG. 4 is insufficient between both members, the expansion operation of the adhesive in the fabric between both members can be made up by a pushing operation of end core member 5 toward second outer shell member 3 side accompanied with the pushing operation of first outer shell member 2.

By the above-described steps, the adhesive is sufficiently expanded in the fabric at a desirable formation over the entire region to be interposed with the adhesive, and the structural members are bonded to each other via the adhesive expanded in the fabric and being cured.

FIG. 6 shows an example of a structure with respect to the bonding portion between first outer shell member 2 and second outer shell member 3 wherein a fabric is disposed relative to the edge of the intervention region of an adhesive so as to extend over both sides of the edge, and in a fabric extending region at a non-bonding portion side adjacent to the edge, an adhesive stuck out of the bonding portion is cured in a bead-like form. Namely, as shown in FIG. 6(A), fabric applied with adhesive in a line-like or dot-like form is disposed between first outer shell member 2 and second outer shell member 3, as shown in FIG. 6(B), when the first outer shell member 2 is fitted onto the second outer shell member 3, the adhesive 7 is expanded in the fabric 6 as well as a part of the adhesive 7 is stuck out of the bonding portion, the stuck-out adhesive 7 is held by the portion of the fabric 6 present there, and therefore, even when the fitting is completed, as shown in FIGS. 6(C) and (D), the adhesive stuck out of the edge of the bonding portion to the fabric extending region at the non-bonding portion side is left as a bead-like adhesive stuck-out portion 21, and this bead-like adhesive stuck-out portion 21 is cured as it is. This adhesive portion 21 cured as a bead-like form (adhesive bead) exhibits the following shear lag effect, and by this, the bonding strength between the structural members, particularly, the resistance against tensile shear, can be increased.

Figure 7:
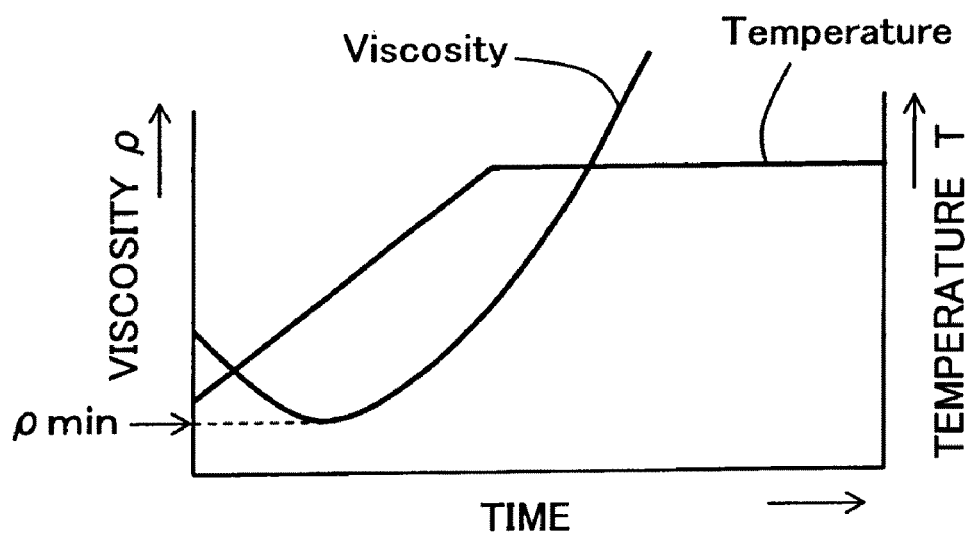
FIG. 7 is a graph showing an example of viscosity reduction when an adhesive is heated.

This shear lag effect will be explained referring to the diagrams shown in FIGS. 7 to 9. Particularly in a case of a hot-setting type adhesive, for example, as shown in FIG. 7, when temperature T is elevated to a predetermined curing temperature, a phenomenon is exhibited wherein viscosity $\rho$ is once decreased, and through a minimum viscosity $\rho min$, the viscosity is increased again. When such a decrease of the viscosity is caused, in the end portion of the bonding portion between the members to be bonded to each other (that is, the portion where the adhesive is released from the region to be interposed with the adhesive), the adhesive decreased in viscosity flows out, and the adhesive is not held at the portion. However, by the existence of the fabric in this portion, the adhesive, which is decreased in viscosity and is about to flow out, can be held by the fabric, and the above-described bead is formed.

Figure 8:
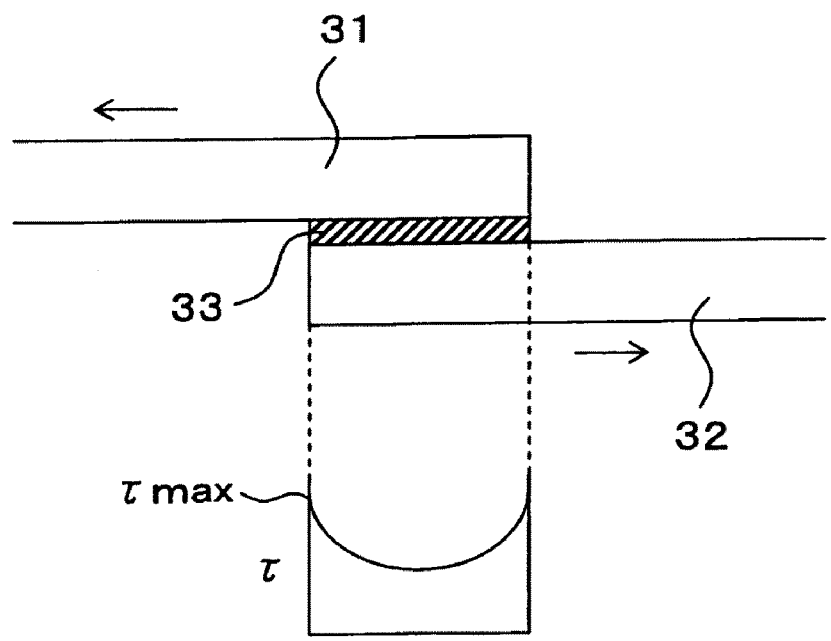
FIG. 8 is an explanation diagram showing an example of a distribution of shear stress in a bonding portion in a case where there is no stuck out portion of adhesive.
Figure 9:
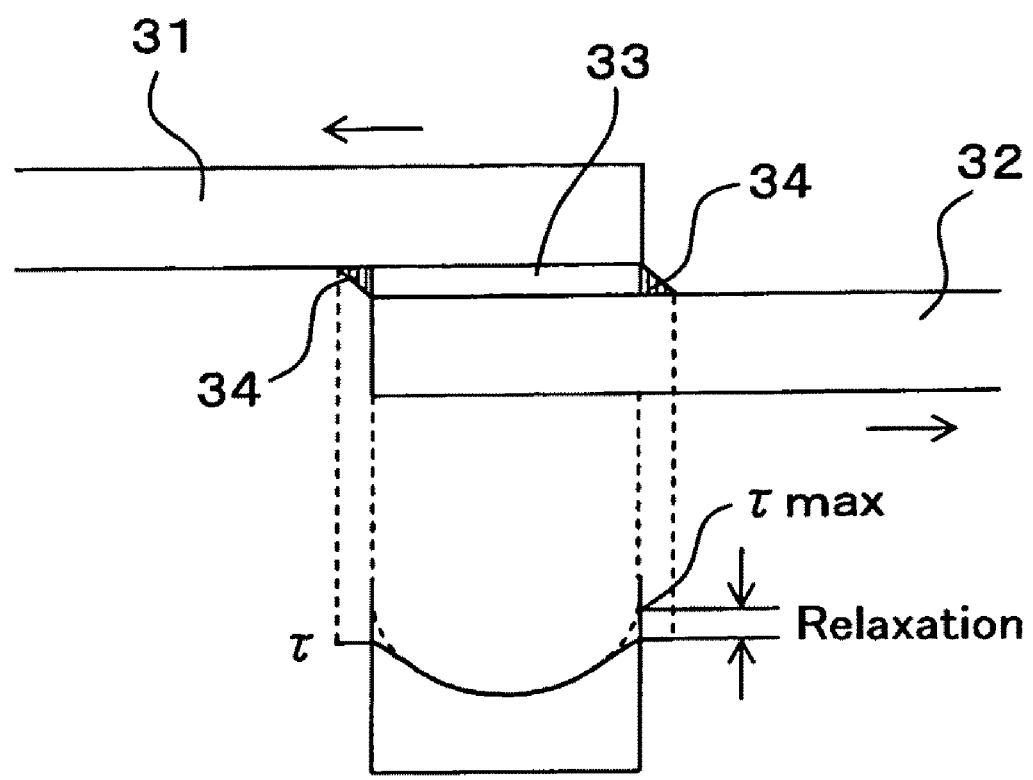
FIG. 9 is an explanation diagram showing an example of a distribution of shear stress in a bonding portion in a case where there are stuck out portions of adhesive.

FIGS. 8 and 9 exemplify the state of tensile shear stress $\tau$ as to cases where such an adhesive is not present and where such an adhesive is present. As shown in FIG. 8, in a case where a stuck-out adhesive is not present in adhesive layer 33 intervening between members to be bonded 31 and 32 and the above-described adhesive bead is not present, when a tensile shear force is applied in the direction indicated by the arrows, the distribution of tensile shear stress $\tau$ shown in the figure is exhibited in the bonding region, and it becomes a maximum tensile shear stress $\tau max$ at the end portion of the bonding region. Therefore, this portion becomes a portion determining the limit of bonding strength against shear. On the other hand, as shown in FIG. 9, in a case where an adhesive bead 34 (an adhesive stuck-out portion), which is held by the fabric and cured as it is as described above, is formed, the maximum tensile shear stress at this adhesive bead 34 portion and the end portion of the bonding region is relaxed so as to be lowered than the above-described $\tau max$. This is called as "shear lag effect" in the present application. By exhibiting such a shear lag effect, consequently the bonding strength between both members to be bonded 31 and 32 can be increased, and in particular, the resistance against tensile shear can be increased. In the present invention, as aforementioned, the adhesive bead capable of exhibiting such a shear lag effect can be easily formed by the fabric, and therefore, a high resistance against tensile shear can be realized.

The crank for a bicycle and the method for manufacturing the same according to the present invention can be applied to any crank for a bicycle requiring bonding between structural members to each other with an adhesive.

Although embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. A method for manufacturing a crank for a bicycle by bonding structural members of said crank to each other with an adhesive intervening between said structural members, said method comprising:
   a step for applying said adhesive in a line-like or dot-like form in correspondence with an intervention region of said adhesive;
   a step for disposing a fabric in correspondence with said intervention region of said adhesive, wherein said fabric is disposed so as to extend over both sides of an edge of said intervention region of said adhesive at a non-bonding portion side adjacent to the edge of said intervention region;
   a step for expanding said adhesive applied in a line-like or dot-like form in said fabric including a fabric extending region at the non-bonding portion side adjacent to the edge of said intervention region; and
   a step for bonding said structural members to each other with said adhesive expanded in said fabric, wherein in a fabric extending region at a non-bonding portion said adjacent to said edge of an intervention region of said adhesive, and adhesive stuck out of said bonding portion is cured in a bead-like form.

2. The method for manufacturing a crank for a bicycle according to claim 1, wherein a nonwoven fabric is used as said fabric.

3. The method for manufacturing a crank for a bicycle according to claim 1, wherein, after said adhesive is applied to said fabric in a line-like or dot-like form, said fabric applied with said adhesive is disposed in correspondence with said intervention region of said adhesive.

4. The method for manufacturing a crank for a bicycle according to claim 1, wherein, after said adhesive is applied to at least one of said structural members in a line-like or dot-like form, said fabric is disposed in correspondence with said intervention region of said adhesive of said structural member applied with said adhesive.

5. The method for manufacturing a crank for a bicycle according to claim 1, wherein said adhesive applied in a line-like or dot-like form is expanded in said fabric at a gap formed between said structural members, utilizing an operation for assembling said structural members at a predetermined positional relationship.

6. The method for manufacturing a crank for a bicycle according to claim 1, wherein at least one of said structural members is formed from a fiber reinforced plastic.

7. The method for manufacturing a crank for a bicycle according to claim 1, wherein a step is provided for bonding structural members, each having a C-shape cross section, to each other.

8. The method for manufacturing a crank for a bicycle according to claim 1, wherein a step is provided for bonding structural members, each forming a cross section with a hollow portion, to each other.

9. The method for manufacturing a crank for a bicycle according to claim 8, wherein a structural member to be bonded by said adhesive expanded in said fabric comprises a block member disposed in said hollow portion.

10. The method for manufacturing a crank for a bicycle according to claim 9, wherein said block member is an aluminum member.

11. A crank for a bicycle formed by structural members bonded to each other with an adhesive intervening at a bonding portion between said structural members, characterized in that a fabric is interposed at said bonding portion together with said adhesive, and said adhesive is cured at a condition being expanded in said fabric, wherein said fabric is disposed so as to extend over both sides of an edge of an intervention region of said adhesive and in a fabric extending region at a non-bonding portion side adjacent to said edge of an intervention region of said adhesive, and adhesive stuck out of said bonding portion is cured in a bead-like form.

12. The crank for a bicycle according to claim 11, wherein said fabric is a nonwoven fabric.

13. The crank for a bicycle according to claim 11, wherein at least one of said structural members is formed from a fiber reinforced plastic.

14. The crank for a bicycle according to claim 11, wherein structural members, each having a C-shape cross section, are bonded to each other.

15. The crank for a bicycle according to claim 11, wherein structural members, each forming a cross section with a hollow portion, are bonded to each other.

16. The crank for a bicycle according to claim 15, wherein a structural member bonded by said adhesive cured at a condition being expanded in said fabric comprises a block member disposed in said hollow portion.

17. The crank for a bicycle according to claim 16, wherein said block member is an aluminum member.

* * * * *